March 10, 1964  D. E. RUTTEN  3,124,229
HOPPER FOR SILO CHUTE
Filed July 2, 1962  2 Sheets-Sheet 2

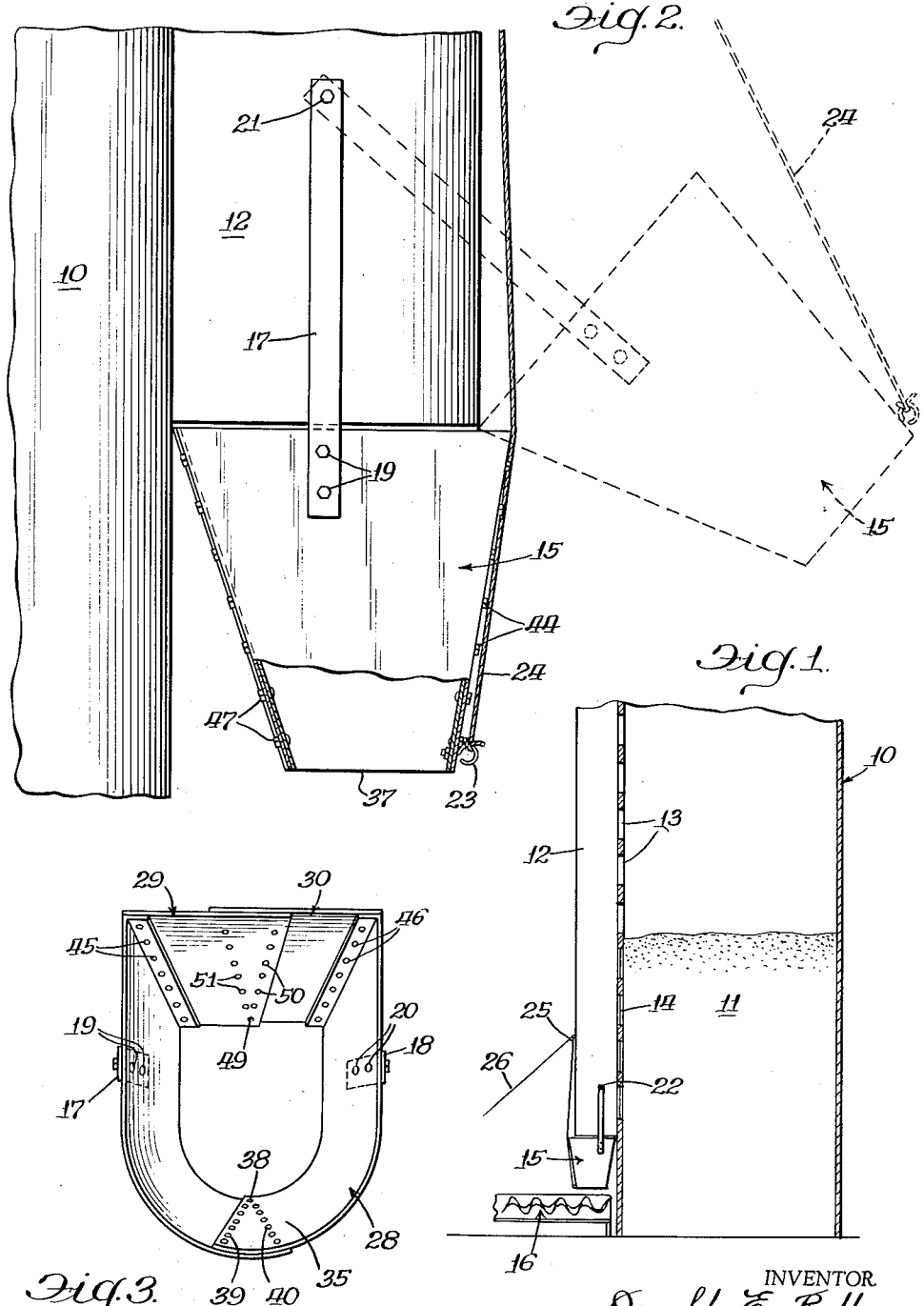

INVENTOR.
Donald E. Rutten
BY
Snow and Benno
Attys.

United States Patent Office 3,124,229
Patented Mar. 10, 1964

3,124,229
HOPPER FOR SILO CHUTE
Donald E. Rutten, Division St., Plainfield, Ill.
Filed July 2, 1962, Ser. No. 206,901
8 Claims. (Cl. 193—2)

This invention relates to a new and improved adjustable hopper for silo chutes.

Silos, used by farmers to store silage for the feeding of livestock are usually equipped with a vertical chute along the outside thereof through which silage from the interior is discharged. The present invention is concerned with a discharge hopper or spout for the bottom of a vertical silo chute to direct silage to desired locations.

The instant invention is further directed to an improvement over my copending application entitled Silo Chute Hopper, having Serial Number 96,756, filed March 20, 1961, now Patent No. 3,061,063.

A principal object of the present invention is to provide a hopper capable of being adjusted for various sizes of silo chutes.

Another important object of this invention is the provision of a chute hopper comprising cooperative parts for joining in various adjusted relationships to effect various sizes of hoppers for operation with various sizes of silo chutes.

Still another important object of this invention is to supply silo chute hoppers having cooperative sides and fronts for adjustment in various relationships and including intermediately disposed adjustable size back members.

Another and still further important object of this invention is to equip a multi-part silo chute hopper with various cooperative parts having multiple holes therein to effect joining of the several cooperative parts in any one of several combinations of adjustment to effectively provide a hopper capable of association with various sizes of silo discharging chutes.

Another object as set forth in the preceding paragraphs in which the holes for joining the cooperative parts together radiate upwardly and outwardly from a common juncture point at the bottom of the hopper whereby the chute attaching end of the hopper may be adjusted throughout a wide range for attachment to chute of various sizes and wherein the discharge bottom portion of the hopper remains substantially the same regardless of the adjustment of the upper chute attaching side of the hopper.

Still another important object of this invention is to provide means for swingably attaching an adjustable hopper to the bottom end of a vertical silo chute.

A still further important object of this invention is to equip an adjustable hopper for silo chutes with pulley means for swingably joining the hopper with a vertically disposed silo chute to alternately use the hopper for deflecting silage as desired or to entirely remove the hopper from the underside of the chute to permit personnel to enter the bottom end of the discharging silo chute.

Other and further important objects and advantages will become apparent from the disclosures in the following specification and accompanying drawings.

In the drawings:

FIGURE 1 is a vertical sectional view taken through a farm silo used for storing silage to be used for livestock feed throughout the non-growing season.

FIGURE 2 is an enlarged view, partially in section, of the discharge hopper of the silo as shown in FIGURE 1.

FIGURE 3 is a top plan view of the adjustable size hopper of this invention.

As shown in the drawings:

Figure 4:
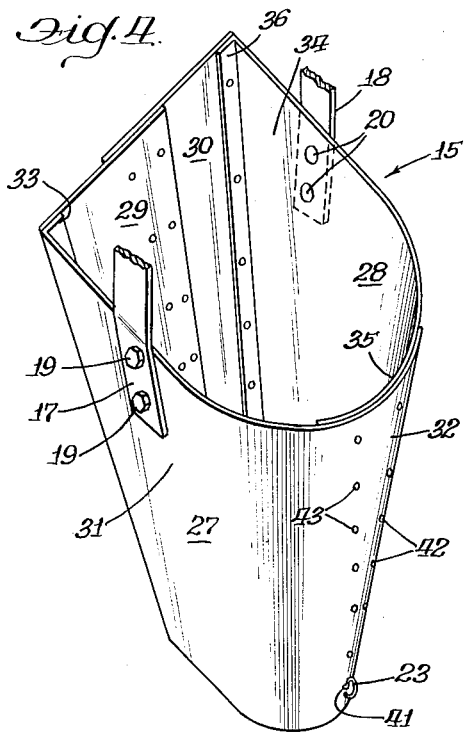
FIGURE 4 is an isometric view of the adjustable size hopper as shown in FIGURE 3.

The reference numeral 10 indicates generally a cylindrically shaped silo within which a farmer stores his ensilage during the growing season and then removes the silage from the silo to feed his livestock. The silage is indicated by the reference numeral 11 in FIGURE 1. A combination filling and discharge chute 12 is mounted along the side of the silo 10 and provides a passageway through which silage is removed from the silo. The vertical chute 12 is generally semi-cylindrical in shape and is located adjacent a series of passageways 13 through which the silage 11 is passed for discharge through the chute 12. Below the level of the silage 11 the passageways 13 are equipped with doors or closure members 14 to thereupon hold the silage within the silo 10. In order to discharge or remove silage from the silo the closure member 14 located at the approximate level of the silage within the silo is removed. Thereafter the silage may be passed through the opening 13 and thence down the chute 12.

The bottom of the chute 12 is equipped with a silage directing hopper 15 such as shown in my copending application on Silo Chute Hopper, Serial Number 96,756. The hopper 15, located at, and attached to, the bottom of the chute 12 is utilized to deflect or direct silage away from the side of the silo 10 and into a receptacle such as a wagon or box or into a laterally disposed trough-like conveyor 16 for delivery of the silage to some remote station. The silage directing hopper 15 is mounted onto the lower end of the chute 12 by means of spaced apart side arms 17 and 18. The arms 17 and 18 are rigidly fastened to the sides of the hopper 15 by bolts or rivets or the like 19 and 20 respectively. The arms 17 and 18 are thus a unitary part of the hopper. The upper ends of the arms are pivotally mounted to opposite sides of the chute 12 as shown at 21 and 22 respectively. As in my copending application the arms 17 and 18 are sufficiently long and their pivotal mountings 21 and 22 positioned such that the hopper 15 may be swung out from the bottom of the chute 12 to permit access to the chute by personnel who might be attending the silo. An eyebolt 23 is provided on the lower front side of the hopper 15 and has a rope member 24 fastened thereto which extends upwardly along the front side of the chute 12 and thereupon passes through a pulley 25 fixedly carried on the front of the chute and thence downwardly as shown at 26 so that an operator upon pulling the rope may cause the hopper 15 to swing outwardly and upwardly from its position beneath the chute 12 about the opposed hinges 21 and 22 as shown in dashed lines in FIGURE 2. In the dash line position of the hopper as shown in FIGURE 2 the bottom of the silo chute 12 is completely unobstructed and personnel may have easy access to the chute for climbing up to a position within the silo 10.

Silo chutes 12 are made of many different sizes and as stated above it is an object of the present invention to provide hopper means capable of adjustment for all sizes of silo chutes. The discharge end of the hopper 15 should remain a constant size because the silage delivered therethrough is directed to the same receiving trough or receptacle. It is thus only the upper end of the hopper which must have its size changed in order to permit the hopper to be accommodated to various sizes of silo chutes.

As best shown in FIGURES 3 and 4 the hopper 15 consists of two pairs of components 27 and 28, and 29 and 30. The member 27 constitutes one side and a portion of the front of the adjustable hopper 15. The elements of the component member 27 are the side 31, the curved or arcuately shaped front portion 32, and the inwardly extending flange 33 at the back of the hopper. Similarly the complementary component element 28 of the hopper 15 is provided with a side 34, an arcuately extending front portion 35 and an inwardly turned flange 36 along the rear edge of the side 34. The front arcuate portions 32 and 35 are adapted to overlap one another and be fastened in any one of several selected positions of relationship so that the upper end of the hopper 15 may be made larger or smaller as desired. The rear wall of the hopper 15 is composed of the second pair of complementary parts 29 and 30 and in the same manner as the complementary front and side elements are adjusted relative to one another, so also are these back elements 29 and 30 adjusted relative to each other to provide for various sizes thereof to match the adjustment of the combination side and front members 27 and 28. The front portions 32 and 35 are equipped with a plurality of holes arranged in a V-shaped pattern with the apex of the V located adjacent the bottom of the hopper 15. An opening 37 through the bottom of the hopper forms a restricted passageway through which silage is converged or aggregated so that it may be conveniently directed as desired.

The arcuate front portion 35 of the combination side and front member 28 is provided with a hole 38 at the bottom thereof which constitutes the apex of the V-shaped arrangement of two radiating lines or series of holes 39 and 40. The holes 39 and 40 are arranged in generally uniform incremental spacing from the bottom to the top of the hopper 15 and on arcs drawn about the apex 38 as a center. Similarly as shown in FIGURE 4 the other combination side and front member 27 has its front portion 32 equipped with a V-shaped pattern of holes with the lower central apex hole shown at 41 through which is mounted a fastener and in this instance the eyebolt 23 to receive the operating or pull rope 24. One side of the V includes a series of spaced holes 42 and similarly the other side of the V is provided with a series of spaced holes 43. The V-shaped pattern of openings is defined by the side line or series of holes 42 and the diverging spaced apart line or series of holes 43 joined by the apex 41. In the adjustment of the hopper 15 as shown in both of FIGURES 3 and 4 the relationship of the component parts is considered to result in a medium size hopper. Bolts or other fastening means may be used to pass through the aligned series of holes 39 and 43 and through the holes 40 and 42. A single bolt such as the eyebolt 23 passes through the aligned apex holes 38 and 41. If it is desired to enlarge the size of the top opening in the hopper 15 the fastening means are removed from the aligned holes 39 and 43 and 40 and 42 and thereafter the parts 27 and 28 are swung about the eyebolt 23 or other fastener means as a hinge until the series of holes 39 become aligned with the series of holes 42 whereupon bolts or fastening means are inserted therethrough. In this enlarged top opening of the hopper 15 the parts are held in a minimum of overlapped relationship. Now, conversely, if the hopper is to be made smaller at the top the fastening means are removed from the aligned holes and the parts 27 and 28 again swung about the eyebolt 23 as a hinge and the parts moved so that there is the greatest amount of overlap of the front portions 32 and 45 in which fastening holes are in alignment. In this smallest top opening of the hopper 15 the fastening holes 40 and 43 are aligned one with the other so that fastening means may be applied to cause the hopper to be held in this position. It should be understood that all of the spaced holes 39, 40, 42 and 43 are located on arcuate segments of circles having the apex holes 38 and 41 as a common center thereof.

As best shown in FIGURE 2 the fastening means passing through the aligned holes of the component parts of the adjustable hopper are bolts. The front sections 27 and 28 are joined by a series of bolts 44 which pass through the aligned holes 39 and 43 and 40 and 42 in the adjusted position of the hopper parts as shown in FIGURES 3 and 4. The flange 33 of the member 27 is provided with a series of spaced apart holes 45. Similarly the rear flange 36 on the cooperative side 28 is provided with a series of spaced apart holes 46. As shown in FIGURE 2 bolts 47 are adapted to join the sides to the back members.

Figure 5:
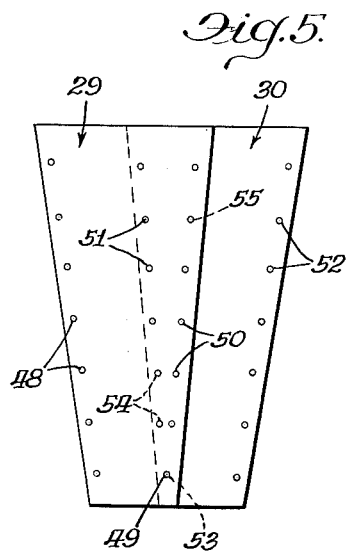
FIGURE 5 is an elevational view of the rear face of the adjustable hopper with the rear face adjusted for normal or medium size top opening of the hopper.
Figure 6:
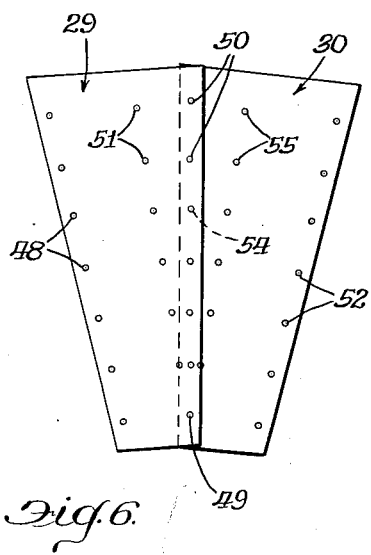
FIGURE 6 is a view similar to FIGURE 5 with the rear face members expanded to their maximum extent to produce a large hopper opening.
Figure 7:
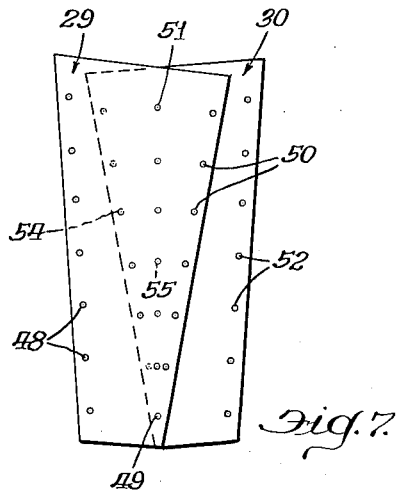
FIGURE 7 is another elevational view of the rear face of the adjustable hopper such as shown in FIGURES 5 and 6, but with the rear face parts arranged in maximum overlapped relationship to produce a small hopper opening.

The back members 29 and 30 are disposed generally parallel to the front portions 32 and 35 and as shown in FIGURES 5, 6 and 7 are equipped with an arrangement of centrally disposed holes comparable to the holes in the front portions to enable the parts to be fastened in various degrees of overlapping relationship. The back member 29 is further provided with a series of spaced apart holes 48 along its outer edge. It is through the aligned holes 45 in the flange 33 and the holes 48 in the back member 29 which the bolts 47 pass to hold the back member 29 to the side and front member 27.

The back member 29 is further provided with an apex hole 49 located on the lower inner edge of that member. This apex hole 49 constitutes the center of the hopper back and is in general axial alignment with the apex holes 38 and 41. One series or line of spaced apart holes 50 extends upwardly and is angled outwardly from the apex hole 49. A second series or line of spaced apart holes 51 extends upwardly and is angled outwardly from the apex hole 49 in a direction diverging from the series of holes 50. Together the diverging lines of spaced holes 50 form a V-shape with the apex hole 49 serving as the center bottom of the V.

The other complementary back member 30 is provided with a series of spaced holes located adjacent the outer edge thereof. This outer series of holes is adapted to be placed in alignment with the holes 46 in the flange 36 to receive fastening means such as the bolts 47. The member 30 has an apex hole 53 on its lower inner edge which constitutes the center of the hopper back including the members 29 and 30. One series or line of spaced apart holes 54 extends upwardly and is angled outwardly from the apex hole 53. A second series or line of spaced apart holes 55 extends upwardly and is angled outwardly from the apex hole 53. The series of holes 55 diverges from the series of holes 54. These diverging series of holes 54 and 55 form a V-shape with the apex hole 53 serving as the center bottom of the V. A medium sized hopper is shown in FIGURES 3 and 4. In this position of adjustment the series of holes 50 and 51 in the part 29 are in alignment with the series of holes 54 and 55 in the complementary part 30. Here again as for the holes in the front members the holes in the back members are positioned on arcs drawn about the aligned apex holes 49 and 53 as centers. Thus the lower edge of the back member of the hopper 15 remains fixed in size whereas the upper end of the back of the hopper may be varied in extent in the same manner as the combination side and front member.

As previously stated the adjustment of the parts shown in FIGURES 3 and 4 produces a medium sized opening for the top of the hopper 15 for attachment to the underside of a silo chute 12 such as shown in FIGURES 1 and 2. The arrangement of the back members 29 and 30 such as shown in FIGURE 5 conforms to the medium size hopper opening of FIGURES 3 and 4. Now if it is desired to increase the size of the top of the hopper 15 to accommodate attachment of the hopper to a larger size of silo chute 12 the bolt members are removed from the aligned openings and the parts 29 and 30 swung outwardly about the apex holes 49 and 53 as a hinge to a position of minimum overlapping of the parts 29 and 30. Particularly the parts are moved to a position where the holes 50 on the extreme inner edge of the part 29 are in alignment with the holes 54 on the extreme inner edge of the part 30 so that the consisting of the complementary parts 29 and 30 has its maximum size. The large size back corresponds to the largest top opening of the hopper 15 for attachment to a larger sized silo chute.

FIGURE 7 shows the complementary back parts 29 and 30 in their maximum overlapped position. This relationship of back parts is accomplished by an arcuate rocking of the parts about the aligned apex holes 49 and 53 to a position where the holes 51 and 55 are in alignment and bolt means are employed to hold the parts in this relative positioning. With the parts 29 and 30 collapsed or overlapped as shown in FIGURE 7 and with the combination side and front elements similarly collapsed or overlapped to their maximum extent as provided by the hole alignments the upper end of the hopper has its smallest opening. The hopper 15 may thus be effectively mounted on a chute.

It should thus be apparent that with the particular hole arrangements in the component parts of the hopper the hopper may be adjusted for accommodation to any one of several sizes of silo chutes. In all instances however the lower discharge end of the hopper remains the same size because silage delivered therethrough is desired to be converged or aggregated to a narrow stream for delivery to some receptacle or some further conveyor means. However the top side of the hopper 15 may be adjusted for fitting onto any of several sizes of silo chutes. The adjustment of the hopper is easily accomplished by a removal of the bolts 44 and 47 and the readjustment of overlapping relationships of the combination side and front members 27 and 28 and the back members 29 and 30 about the aligned apices 38 and 41 for the front members and 49 and 53 for the back members. Further, in all applications of a hopper to a silo chute the attachment is made by arms hinged to the opposite sides of the silo chute. The hopper attaching arms are arranged to provide for full removal of the hopper from a position beneath the lower discharge end of the chute whereby personnel desiring to service the silo may climb up within the silo without interference from the silage converging hopper associated with the bottom of the chute such as shown in FIGURES 1 and 2.

I am aware that numerous details of construction may be varied throughout a wide range without departing from the principles disclosed herein and I therefore do not propose limiting the patents granted hereon otherwise than as necessitated by the appended claims.

What is claimed is:

1. An adjustable hopper comprising a generally flat hopper back wall, cooperative side and front members, said cooperative side and front members having inwardly turned flanges at their rear edges for abutting said flat hopper back wall, said back wall having inwardly tapering side edges from top to bottom, said back wall having spaced apart holes extending from the top to the bottom along each side thereof, said cooperative side and front members having spaced apart holes in their inwardly turned flanges, and said cooperative side and front members having spaced apart holes radiating in straight lines upwardly from a common point on the bottom and adjacent the front edges, securing means passing through corresponding holes, whereby the hopper may be assembled in various adjusted arrangements.

2. A frusto-conical shaped discharge hopper being generally semicircular in cross section comprising a funnel-like enclosure tapering downwardly into a restricted zone, means adjusting the size of the top of the discharge hopper, said hopper having cooperative components, said cooperative components each having a plurality of spaced apart holes arranged in V-formation, one of said holes forming the apex of the V, the remainder of said plurality of holes of each V-formation being located on arcs drawn about the apex hole as a center, fastener means mounted through the aligned apex holes of said cooperative components, said components capable of being rocked relative to each other about the fastener means in the apex holes as a hinge to cause various holes in the components to become aligned, and fastener means applied through aligned holes in the cooperative components in the desired degree of overlap of said components.

3. A frusto-conical shaped discharge hopper being generally semicircular in cross section comprising a funnel-like enclosure tapering downwardly into a restricted zone, means adjusting the size of the top of the discharge hopper, said hopper having two cooperative pairs of components, said pairs of components each having a plurality of spaced apart holes arranged in a V-formation, one of said holes forming the apex of the V, the remainder of said plurality of holes of each V-formation being located on arcs drawn about the apex hole as a center, fastener means mounted through the aligned apex holes of said two cooperative pairs of components, said components capable of being rocked relative to each other about the fastener means in the apex holes as hinges to cause various holes in the components to become aligned, and fastener means applied through aligned holes in the two cooperative pairs of components in the desired degree of overlap of said pairs of components.

4. A hopper construction comprising a frusto-conical shaped housing generally semicircular in cross section and tapering inwardly from top to bottom, means adjusting the size of the top of said hopper while retaining the same size bottom, said hopper construction comprising a pair of complementary side and curved front portions, and a back wall, said means comprising means hingedly joining overlapped bottom edges of the curved front portions, said curved front portions having a plurality of spaced apart holes identically and arcuately spaced thereon, whereby when said complementary side and curved front portions are rocked about said hinge means two or more holes become aligned at various degrees of overlap of said front portions, fastening means joining said complementary front portions in desired adjusted position, and means fastening said complementary side and curved front portions to said back wall.

5. A hopper construction comprising a frusto-conical shaped housing generally semicircular in cross section and tapering inwardly from top to bottom, means adjusting the size of the top of said hopper while retaining the same size bottom, said hopper construction comprising a pair of complementary side and curved front portions, and a back wall, said means comprising means hingedly joining overlapped bottom edges of the curved front portions, said curved front portions having a plurality of spaced apart holes identically and arcuately spaced thereon, said back wall comprising a pair of complementary flat parts, means hingedly joining overlapped bottom edges of said complementary flat parts, said complementary flat parts having a plurality of spaced apart holes identically and arcuately spaced thereon, whereby when said complementary side and curved front portions and said flat back parts are rocked about their respective hinge means holes in the portions and parts become aligned at various degrees of overlap of said portions and parts, and fastening means joining said complementary portions and parts.

6. A frusto-conical shaped housing being generally semicircular in cross section comprising a housing, said housing including a cooperative pair of integral side and front parts, a cooperative pair of back parts, said front parts and said back parts disposed generally parallel to each other, means hingedly joining overlapping lower edges of the front parts and in axial alignment therewith means hingedly joining overlapping lower edges of the back parts, means fastening the longitudinal edges of said front parts above said lower edges and means fastening the longitudinal edges of said back parts above said lower edges whereby the front parts and the back parts may be placed in any one of selected positions of overlap of said cooperative parts.

7. A frusto-conical shaped housing being generally semicircular in cross section comprising a housing, said housing including a cooperative pair of integral side and front parts, a cooperative pair of back parts, said front parts and said back parts disposed generally parallel to each other, means hingedly joining overlapping lower edges of the front parts and in axial alignment therewith means hingedly joining overlapping lower edges of the back parts, and means fastening the longitudinal edges of said front parts above said lower edges and means fastening the longitudinal edges of said back parts above said lower edges, whereby the front parts and the back parts may be placed in any one of selected positions of overlap of said cooperative parts, said front parts and said back parts having spaced holes in diverging lines extending upwardly from said hinge means and generally adjacent the longitudinal edges of said front parts and said back parts whereby the parts may be adjusted relative to each other in various positions of overlap by applying said fastening means through the aligned holes.

8. An adjustable hopper construction comprising two sections which in cooperation define a frusto-conical shaped funnel generally semicircular in cross section, each of said sections being formed to define one side wall and part of the curved front and flat back walls of said funnel, said cooperation between said two sections being formed by an overlapping of the longitudinal edge portions of said sections to define a generally semicircular open bottom and a larger generally semicircular open top with the sizes thereof dependent upon the degree of overlap, first fastening means hingedly interconnecting the overlapping lower edge portions of said sections, second fastening means extending upwardly of said overlapping edge portions of said sections from said first fastening means for adjustably interconnecting substantially the entire length of the overlapping edge portions of said sections to provide a hopper construction substantially closed along the length of said overlapped edge portions with selective variation in the size of the open upper end of said hopper construction.

References Cited in the file of this patent
UNITED STATES PATENTS

| | | |
|---|---|---|
| 427,874 | Jones | May 13, 1890 |
| 873,749 | Herrick | Dec. 17, 1907 |
| 952,313 | Droz | Mar. 15, 1910 |
| 983,919 | McGuigan | Feb. 14, 1911 |
| 1,040,392 | Ogle et al. | Oct. 8, 1912 |
| 1,164,124 | Schmidt | Dec. 14, 1915 |
| 1,212,524 | Lucas | Jan. 16, 1917 |
| 1,305,627 | Smith | June 3, 1919 |
| 1,430,691 | Sell et al. | Oct. 3, 1922 |
| 2,456,912 | Burrows | Dec. 21, 1948 |
| 2,580,811 | Martinsen | Jan. 1, 1952 |
| 3,061,063 | Rutten | Oct. 30, 1962 |